(12) United States Patent
Zierden et al.

(10) Patent No.: US 12,371,143 B2
(45) Date of Patent: Jul. 29, 2025

(54) DRAIN APPARATUS

(71) Applicant: The Boeing Company, Chicago, IL (US)

(72) Inventors: Alex Zierden, Hood River, OR (US); Brendamari Rodriguez, Forest Grove, OR (US); Christopher Satterwhite, Portland, OR (US)

(73) Assignee: THE BOEING COMPANY, Arlington, VA (US)

( * ) Notice: Subject to any disclaimer, the term of this patent is extended or adjusted under 35 U.S.C. 154(b) by 203 days.

(21) Appl. No.: 18/145,418

(22) Filed: Dec. 22, 2022

(65) Prior Publication Data

US 2024/0208635 A1    Jun. 27, 2024

(51) Int. Cl.
*B64C 1/14*    (2006.01)
(52) U.S. Cl.
CPC .................... *B64C 1/1453* (2013.01)
(58) Field of Classification Search
CPC ...................................... B64C 1/1453
See application file for complete search history.

(56) References Cited

U.S. PATENT DOCUMENTS

| | | | | |
|---|---|---|---|---|
| 2002/0056789 A1* | 5/2002 | Jones | ..................... | B64C 1/1453 244/129.1 |
| 2012/0286095 A1* | 11/2012 | Giamati | ................ | B64C 1/1453 244/136 |
| 2014/0026583 A1* | 1/2014 | Care | ....................... | F01D 25/18 219/722 |
| 2014/0158208 A1 | 6/2014 | Becks et al. | | |
| 2016/0159454 A1* | 6/2016 | Fietz | ..................... | B64C 1/1453 244/129.1 |
| 2016/0376931 A1* | 12/2016 | Leon | ........................ | G01L 7/00 137/557 |
| 2018/0111673 A1* | 4/2018 | Casado Montero | .. | B64C 1/1453 |
| 2018/0283217 A1* | 10/2018 | de Pau, Jr. | ............ | B64C 1/1453 |

FOREIGN PATENT DOCUMENTS

| | | | | |
|---|---|---|---|---|
| DE | 102004053645 A1 * | 5/2006 | ........... | F02D 33/003 |
| GB | 486983 A * | 6/1938 | ........... | B64C 1/1453 |

OTHER PUBLICATIONS

Machine Translation of DE-102004053645-A1, Eder J, May 4, 2006 (Year: 2006).*

* cited by examiner

*Primary Examiner* — Kimberly S Berona
*Assistant Examiner* — Katherine June Walter
(74) *Attorney, Agent, or Firm* — MH2 Technology Law Group LLP

(57) ABSTRACT

Apparatus, method for draining fluid, and method of fabricating a drainage apparatus for drainage of fluid through an exterior of an aircraft are disclosed. The apparatus includes a drain element having an aft end portion and an annular connector, wherein the annular connector is to be disposed within a drain port in an exterior panel of the aircraft. The drain element includes a forward end portion with a contoured protrusion disposed over the annular connector, and a drain opening at the aft end of the contoured protrusion. The contoured protrusion enables fluid to flow from the drain port through the annular connector and out the drain opening. An airflow across the contoured protrusion creates a reduced pressure region external to the drain opening relative to the pressure at the annular connector and drain port, so as to induce fluid flow through the annular connector in the drain port and out the drain opening.

20 Claims, 6 Drawing Sheets

300

310 — Disposing a drain element in an exterior panel of the aircraft, wherein the drain element includes:

a) An aft end portion;

b) An annular connector, wherein the annular connector is to be disposed within a drain port in the exterior of an aircraft, the drain element having a forward end portion with a contoured protrusion disposed over the annular connector; and c) A drain opening at the aft end of the contoured protrusion, wherein the contoured protrusion enables fluid flow from the drain port through the annular connector and out the drain opening 320 — Wherein an airflow across the contoured protrusion creates a reduced pressure region external to the drain opening relative to the pressure at the annular connector and drain port, so as to induce fluid flow through the annular connector in the drain port and out the drain opening

FIG. 3

DRAIN APPARATUS

TECHNICAL FIELD

Examples generally relate to draining fluid through an exterior of a craft. More particularly, examples relate to a drainage apparatus, method for draining fluid, and method of fabricating a drainage apparatus for drainage of fluid through an exterior of an aircraft.

BACKGROUND

Vehicles, particularly airplanes, aerial vehicles and other aircraft including unmanned aerial vehicles (UAV), drones and the like, are widely used and have become critical tools for everyday life. The effective and safe use of these vehicles, however, are often limited by environmental and physical conditions and limitations. For example, normal use may necessitate exposing these vehicles to inclement conditions (e.g., flying in rain) which may subject the vehicles to the accumulation of water/fluid within the structure of the vehicles. Indeed, some circumstances may necessitate exposing these vehicles to severe and/or extreme conditions which may subject the vehicles to an elevated risk of accumulation of water/fluid within the structure. The accumulation of water within the vehicles may lead to increased weight, mechanical failure, or other damage to the vehicles. Consequently, the operability, utility and/or service time of the vehicles may be limited or otherwise altered to avoid the negative impacts of water exposure and accumulation. Further, extended exposure and accumulation of water may lead to limited survivability and a diminished service life of the vehicles. As a result, there remains a need for a convenient and effective apparatus, method, and method of fabricating a drainage apparatus for draining fluid through an exterior of an aircraft or other vehicle.

BRIEF SUMMARY

In accordance with one or more examples, a drainage apparatus for drainage of fluid through an exterior of an aircraft is disclosed. The apparatus includes a drain element having an aft end portion and an annular connector, wherein the annular connector is to be disposed within a drain port in an exterior panel of the aircraft, the drain element having a forward end portion with a contoured protrusion disposed over the annular connector. The apparatus may also include a drain opening at the aft end of the contoured protrusion, wherein the contoured protrusion enables fluid flow from the drain port through the annular connector and out the drain opening. An airflow across the contoured protrusion creates a reduced pressure region external to the drain opening relative to the pressure at the annular connector and drain port, so as to induce fluid flow through the annular connector in the drain port and out the drain opening. The aft end portion of the drain element may optionally include a tension connector to be disposed within an opening in the exterior of the aircraft.

In accordance with one or more other examples, a method for draining fluid through an exterior of an aircraft is disclosed. The method includes disposing a drain element in an exterior panel of the aircraft. The drain element may include an aft end portion and an annular connector, wherein the annular connector is to be disposed within a drain port in the exterior of an aircraft, the drain element having a forward end portion with a contoured protrusion disposed over the annular connector. The drain element may also include a drain opening at the aft end of the contoured protrusion, wherein the contoured protrusion enables fluid flow from the drain port through the annular connector and out the drain opening. An airflow across the contoured protrusion creates a reduced pressure region external to the drain opening relative to the pressure at the annular connector and drain port, so as to induce fluid flow through the annular connector in the drain port and out the drain opening. The aft end portion of the drain element may optionally include a tension connector to be disposed within an opening in the exterior of the aircraft.

In accordance with one or more examples, a method of fabricating a drainage apparatus for drainage of fluid through an exterior of an aircraft is disclosed. The method of fabricating includes forming a drain element having an forming an aft end portion and forming an annular connector, wherein the annular connector is configured to be disposed within a drain port in an exterior panel of the aircraft. The drain element may also be formed to have a forward end portion with a contoured protrusion disposed over the annular connector. The method may also include forming a drain opening at the aft end of the contoured protrusion, wherein the contoured protrusion is configured to enable fluid flow from the drain port through the annular connector and out the drain opening. The drain element may be formed such that an airflow across the contoured protrusion creates a reduced pressure region external to the drain opening relative to the pressure at the annular connector and drain port, so as to induce fluid flow through the annular connector in the drain port and out the drain opening. The aft end portion the drain element may optionally be formed to include a tension connector to be disposed within an opening in the exterior of the aircraft.

In at least some embodiments, the apparatus, method and method for fabricating provide a drain apparatus or device that may be fitted and/or attached to an aircraft or other vehicle during production of the aircraft or other vehicle. In at least some embodiments, the apparatus, method and method for fabricating provide drain apparatus or device that may be retrofitted and/or attached to an aircraft or other vehicle after the production of the aircraft or other vehicle. Accordingly, examples of the apparatus, method and method for fabricating disclosed herein provide a convenient and effective means for draining fluid through an exterior of an aircraft or other vehicle. As a result, the harmful effects of water accumulation within the aircraft, such as added weight, rust and corrosion due to extended water exposure, may be minimized. Consequently, the life of the aircraft, and very expensive and critical components may be extended, and maintenance and repair costs may be reduced. Further, the operating time, operating range, and the capability of the aircraft to perform missions in adverse conditions may also be increased.

The features, functions, and advantages that have been discussed herein may be achieved independently in various examples or may be combined in yet other examples further details of which can be seen with reference to the following description and drawings.

DRAWINGS

The various advantages of the examples of the present disclosure will become apparent to one skilled in the art by reading the following specification and appended claims, and by referencing the following drawings, in which:

FIGS. 1A-D show various views of a drain element for drainage of fluid through an exterior of an aircraft according to an example.

FIGS. 2A-B show cross-sectional views of a drainage apparatus installed in the wing of an aircraft according to examples as shown in FIGS. 1A-D.

FIG. 3 shows a method for draining fluid through an exterior of an aircraft according to examples as shown in FIGS. 1A-D and 2A-B.

DESCRIPTION

Figure 1A:
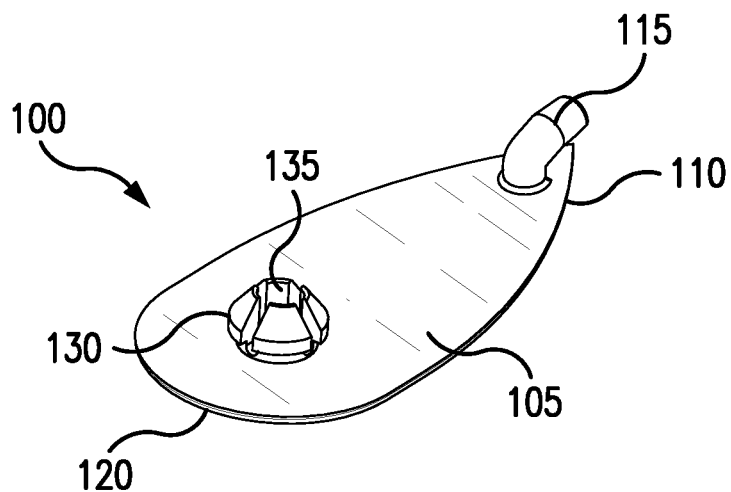
Figure 1B:
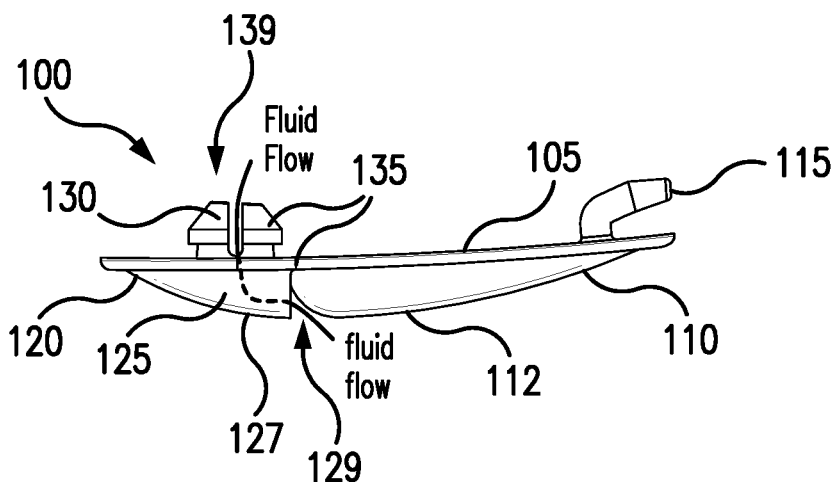

Turning now to FIGS. 1A-1D, in accordance with one or more examples, a drain element 100 for draining fluid through an exterior of an aircraft is shown. In at least one embodiment, as shown in FIG. 1A, the drain element 100 includes an aft (i.e., rear) end portion 110, a forward end portion 120, an annular connector 130, a drain opening 135 and a tension connector 115. The annular connector 130 is to be disposed within a drain port (i.e., an opening) (not shown here) in an exterior panel of the aircraft, as shown in FIGS. 2A-2B. The drain element 100 includes a mating profile 105 having a face designed to be coincident with a structure (e.g., an aircraft) to which the drain element 100 is to be mounted. The forward end portion 120 of the drain element 100 includes a contoured protrusion 125 disposed over the annular connector 130. In at least some embodiments, the contoured protrusion 125 includes a scupper design to create a negative air pressure at the drain opening 135. The drain opening 135 is disposed within the annular connector 130. The drain opening 135 extends from the annular connector 130 to the aft end 127 of the contoured protrusion 125 such that the contoured protrusion 125 enables fluid (e.g., water) to flow from the drain port through the annular connector 130 and out the drain opening 135. In at least one embodiment, as shown in FIG. 1B, the drain element 100 allows an airstream (i.e., airflow) across the contoured protrusion 125 (i.e., in a direction from the forward end portion 120 to the aft end portion 110) to create a reduced pressure region 129 external to the drain opening 135 relative to the pressure at the annular connector 130 and drain port. The reduced pressure at reduced pressure region 129 acts to induce fluid flow through the annular connector 130 in the drain port and out the drain opening 135.

Figure 1C:
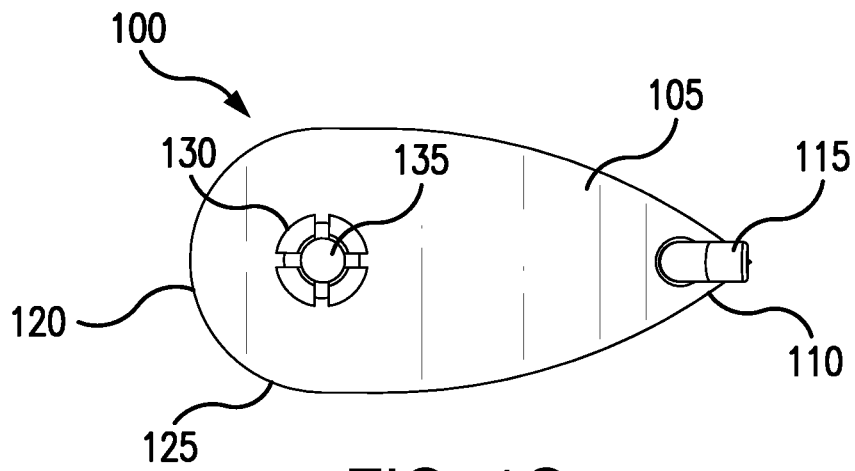
Figure 1D:
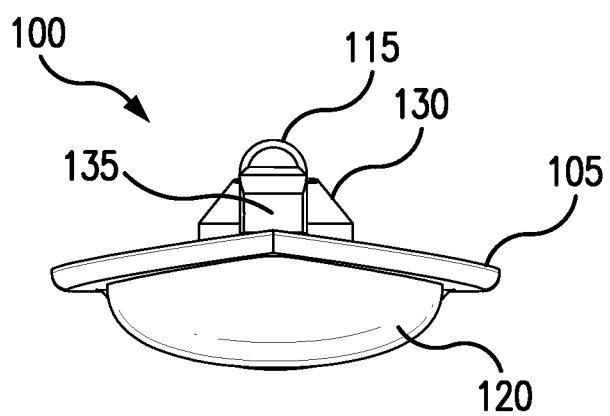
Figure 2A:
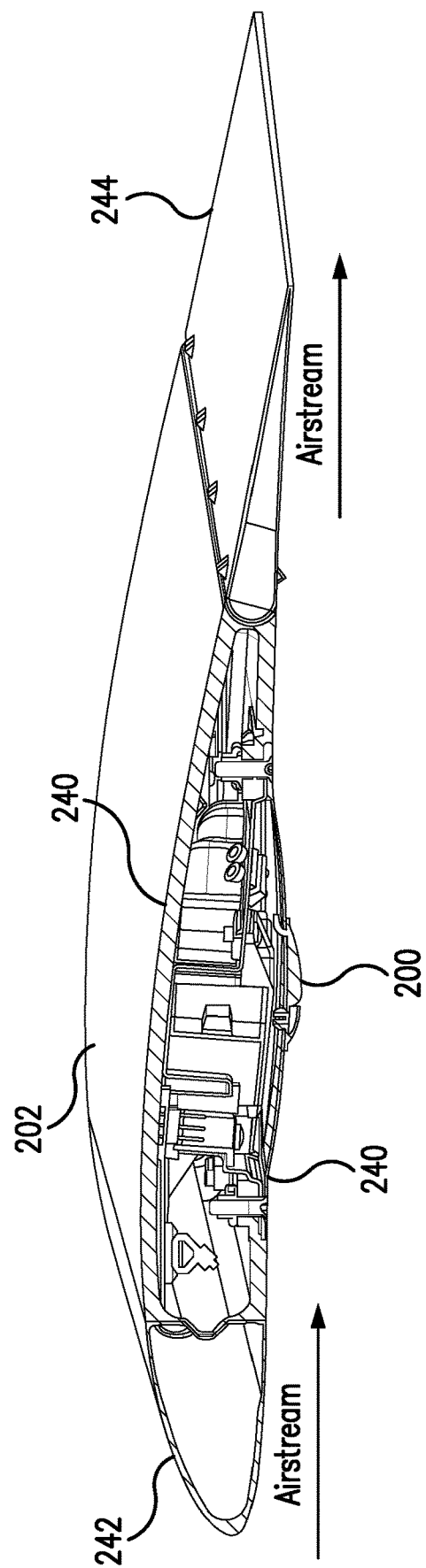
Figure 2B:
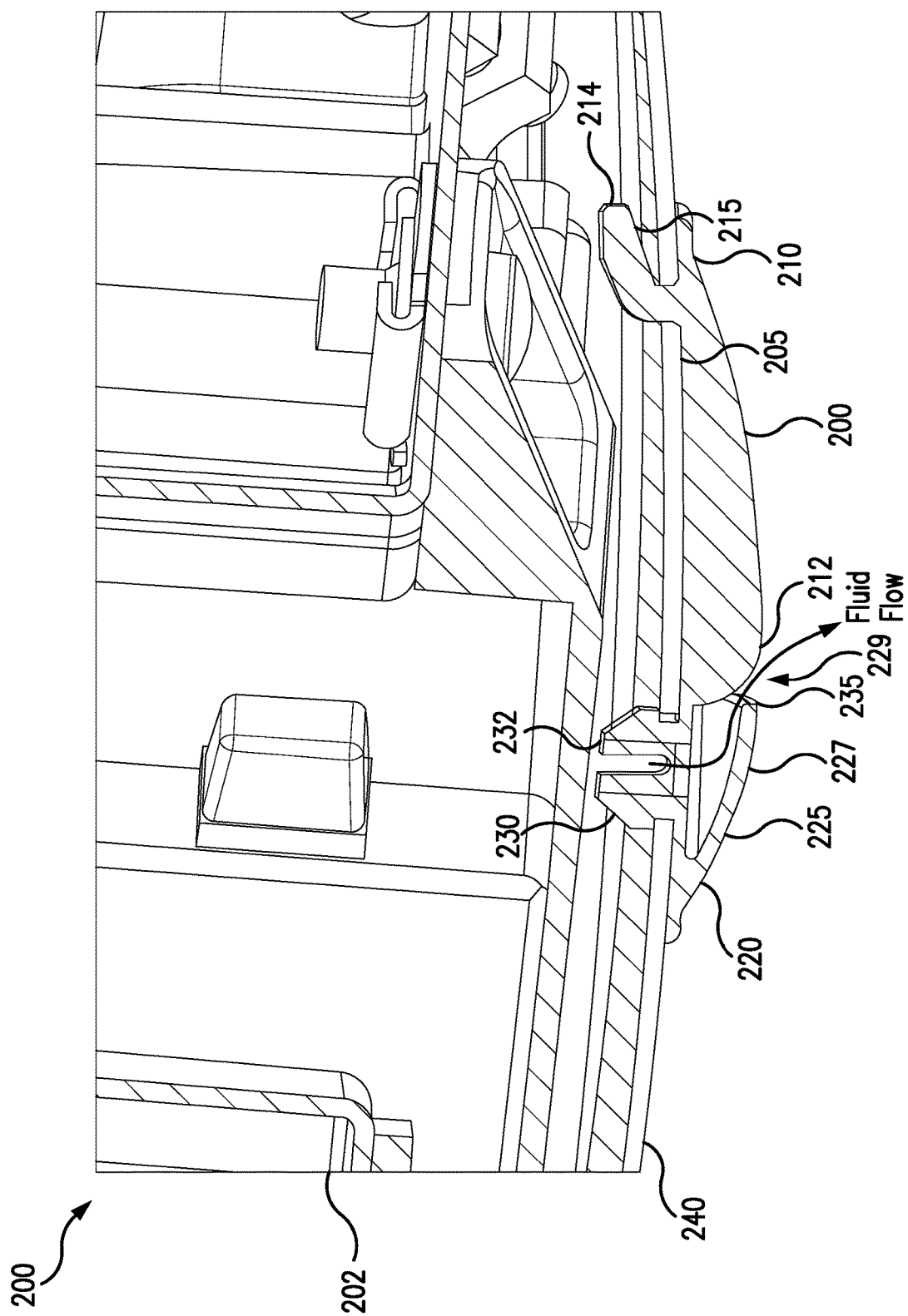

In at least one embodiment, as shown in FIGS. 1A-1D, the aft end portion 110 of the drain element 100 includes a tension connector 115 placed near the aft end portion 110 designed to be disposed within an opening (not shown here) in the exterior of the aircraft. The aft end portion 110 of the drain element 100 also includes a globular protrusion 112 positioned aft of the drain opening 135 to inhibit air turbulence at the end of the contoured protrusion 125 such that flow of an external airstream across the contoured protrusion 125 and the globular protrusion 112 is generally laminar. In at least one embodiment, the contoured protrusion 125 comprises a generally parabolic shape, as shown in FIGS. 1B-1D, and the globular protrusion 112 comprises a generally bullet or teardrop shape, as shown in FIGS. 1A-1C, to reduce turbulence and minimize impact to laminar flow. FIG. 1D depicts a frontal view of the drain element 100 from a perspective as an airstream would flow towards the forward end portion 120 of the drain element 100. The mating profile 105 designed to match the contour of a structure (e.g., an aircraft or other vehicle) to which it is to be attached is also shown. The mating profile 105 is designed to fit such that it closely abuts and matches the profile of the structure. The annular connector 130, drain opening 135, and an optional tension connector 115 are also shown. In at least some embodiments, the tension connector 115 and the annular connector 130 are designed to be placed within openings in the aircraft such that the drain element 100 is retained under tension therein.

In at least some embodiments, the optional tension connector 115 is designed to be placed within an opening within the aircraft such that the annular connector 130 may be pressed within another opening within the aircraft. The annular connector 130 may include a press fit connector design (e.g., an anvil profile having spaced apart vertical opening and an annular shoulder) to secure the annular connector 130 within the opening. The annular connector 130 is designed to, upon being mated with the aircraft, maintain the tension connector 115 in tension within the aircraft such that the drain element 100 is securely fitted within the aircraft. In at least some embodiments, an adhesive may also be placed between the drain element 100 and the aircraft to more securely mate the drain element 100 and the aircraft. The drain opening 135 is in communication with the drain port (not shown) of the aircraft, to enable fluid flow from an interior region within the aircraft through the drain port and out the drain opening 135 into an external airstream.

In at least one embodiment, the contoured protrusion 125 is configured to create a pressure differential between an interior pressure 139 near the drain opening 135 and a pressure of an external airstream flowing across the aircraft wing 202 (i.e., flowing in a direction from a forward or leading edge 242 to an aft or trailing edge 244) (see FIGS. 2A-2B), to cause a suction effect across the drain opening 135 that induces the drainage of water through the annular connector 130 and out the drain opening 135. In at least some embodiments, the contoured protrusion 125 is configured to create a pressure differential between an interior pressure near the drain opening 135 and an external airstream pressure. The pressure differential causes a suction effect across the drain opening 135 that induces drainage of water and other fluids through the annular connector 130 and out the drain opening 135. More particularly, an airstream or airflow across the contoured protrusion 125 creates a reduced pressure region 129 external to the drain opening 135 relative to the pressure at the annular connector 130 and drain port, so as to induce fluid flow through the annular connector 130 in the drain port and out the drain opening 135. The aft end portion 110 of the drain element 100 may optionally include a tension connector 115 to be disposed within an opening in the exterior of the aircraft. The size (i.e., diameter) of the drain opening 135 should be equal to or larger than the size of the internal orifice of the annular connector 130 to ensure a proper and constant flow of fluid. That is to say that the drain opening 135 is less than a predetermined size so as to minimize any impact on an electromagnetic interference (EMI) shielding. The annular connector 130 should also be sized to the maximum allowable aperture (i.e., the maximum opening) of the drain port in order to maintain electromagnetic interference (EMI) shielding. As a result, the drain element 100 allows water and other fluids to be continually, passively and reliably drained from the aircraft. In various embodiments, the drain element 100 includes a low-profile design, extends minimally from the aircraft, and includes contours to minimize drag.

Turning to FIGS. 2A-2B, a drain element 200 is shown. The drain element 200 may be installed within a wing 202 of an aircraft. FIG. 2A depicts a cross-section of an aircraft wing 202 having the drain element 200 installed within the wing 202. The wing 202 includes a leading edge 242, a trailing edge 244, and an internal cavity 240 that may house other components. The internal cavity 240 may be susceptible to fluids, e.g., water from rain, snow and the like, accumulating within the internal cavity 240. As shown in FIG. 2B, the drain element 200 includes components substantially similar to drain element 100 shown in FIGS. 1A-1D. The drain element 200 may include a mating profile 205 having a face designed to be coincident with the aircraft wing 202. The drain element 200 may also include, for example, a tension connector 215 disposed near an aft end portion 210, and a forward end portion 220 having a contoured protrusion 225. The tension connector 215 is designed to be connected within an opening 214 within the aircraft wing 202. The drain element 200 also includes an annular connector 230 having a drain opening 235 positioned therein. The annular connector 230 is designed to attach to a drain port 232 within the aircraft wing 202. The drain opening 235 extends from the annular connector 230 to the aft end 227 of the contoured protrusion 225 such that the contoured protrusion 225 enables fluid (e.g., water) to flow from the drain port 232 through the annular connector 230 and out the drain opening 235. The contoured protrusion 225 of the leading edge 220 is designed to be disposed or positioned over the annular connector 230 such that an airstream that flows across the contoured protrusion 225 creates a reduced pressure region 229 external to the drain opening 235 relative to the pressure at the annular connector 230 and drain port 232. The aft end portion 210 of the drain element 200 also includes a globular protrusion 212 positioned aft of the drain opening 235 to inhibit air turbulence at the end of the contoured protrusion 225 such that flow of an external airstream across the contoured protrusion 225 and the globular protrusion 212 is generally laminar. In at least one embodiment, as shown in FIG. 2B, the contoured protrusion 225 comprises a generally parabolic shape, and the globular protrusion 212 comprises a generally bullet or teardrop shape to reduce turbulence and minimize impact to laminar flow. The reduced pressure region 229 induces a fluid flow through the annular connector 230 (disposed in the drain port 232) and out the drain opening 235. The fluid flow through the drain opening 235 allows for any fluid that may have accumulated within the internal cavity 240 to be drained to an airstream exterior of the wing 202.

FIG. 3 shows a method 300 for draining fluid through an exterior of an aircraft. In at least some embodiments, the method 300 may be used to drain fluid through an exterior of an aircraft (e.g., aircraft wing 202). The method 300, at 310, includes disposing a drain element (e.g., drain element 100, 200) in an exterior panel of the aircraft (e.g., aircraft wing 202). In at least some embodiments, the drain element 100, 200 includes an aft end portion (e.g., 110, 210). The drain element 200, 300 also includes an annular connector (e.g., annular connector 130, 230), wherein the annular connector is to be disposed within a drain port (e.g., drain port 232) in the exterior of an aircraft, the drain element having a forward end portion (e.g., forward end portion 220) with a contoured protrusion (e.g., contoured protrusion 125, 225) disposed over the annular connector. The drain element 200, 300 also includes a drain opening (e.g., drain opening 135, 235) at the aft end (e.g., aft end 127, 227) of the contoured protrusion, wherein the contoured protrusion enables fluid flow from the drain port through the annular connector and out the drain opening. The method 300, at 320, provides wherein airstream or airflow across the contoured protrusion creates a reduced pressure region (e.g., reduced pressure region 129, 229) external to the drain opening relative to the pressure at the annular connector and drain port, so as to induce fluid flow through the annular connector in the drain port and out the drain opening. In at least some embodiments, the aft end portion of the drain element includes a tension connector (e.g., tension connector 115, 215) to be disposed within an opening (e.g., opening 214) in the exterior of the aircraft. In at least some embodiments, the aft end portion of the drain element comprises a globular protrusion (e.g., globular protrusion 112, 212) positioned aft of the drain opening to inhibit air turbulence at the end of the contoured protrusion, such that flow of an external airstream across the contoured protrusion and the globular protrusion is generally laminar. In at least some embodiments, the contoured protrusion comprises a generally parabolic shape, and the globular protrusion comprises a generally bullet or teardrop shape. In at least some embodiments, the drain opening is in communication with the drain port, to enable fluid flow from an interior region (e.g., internal cavity 240) within the aircraft through the drain port and out the drain opening into an external airstream. In at least some embodiments, the contoured protrusion is configured to create a pressure differential between an interior pressure near the drain opening and an external airstream pressure, to cause a suction effect across the drain opening that induces drainage of water through the annular connector and out the drain opening. In at least some embodiments, the drain opening is designed to be less than a predetermined size so as to minimize any impact on an electromagnetic shielding.

Figure 4:
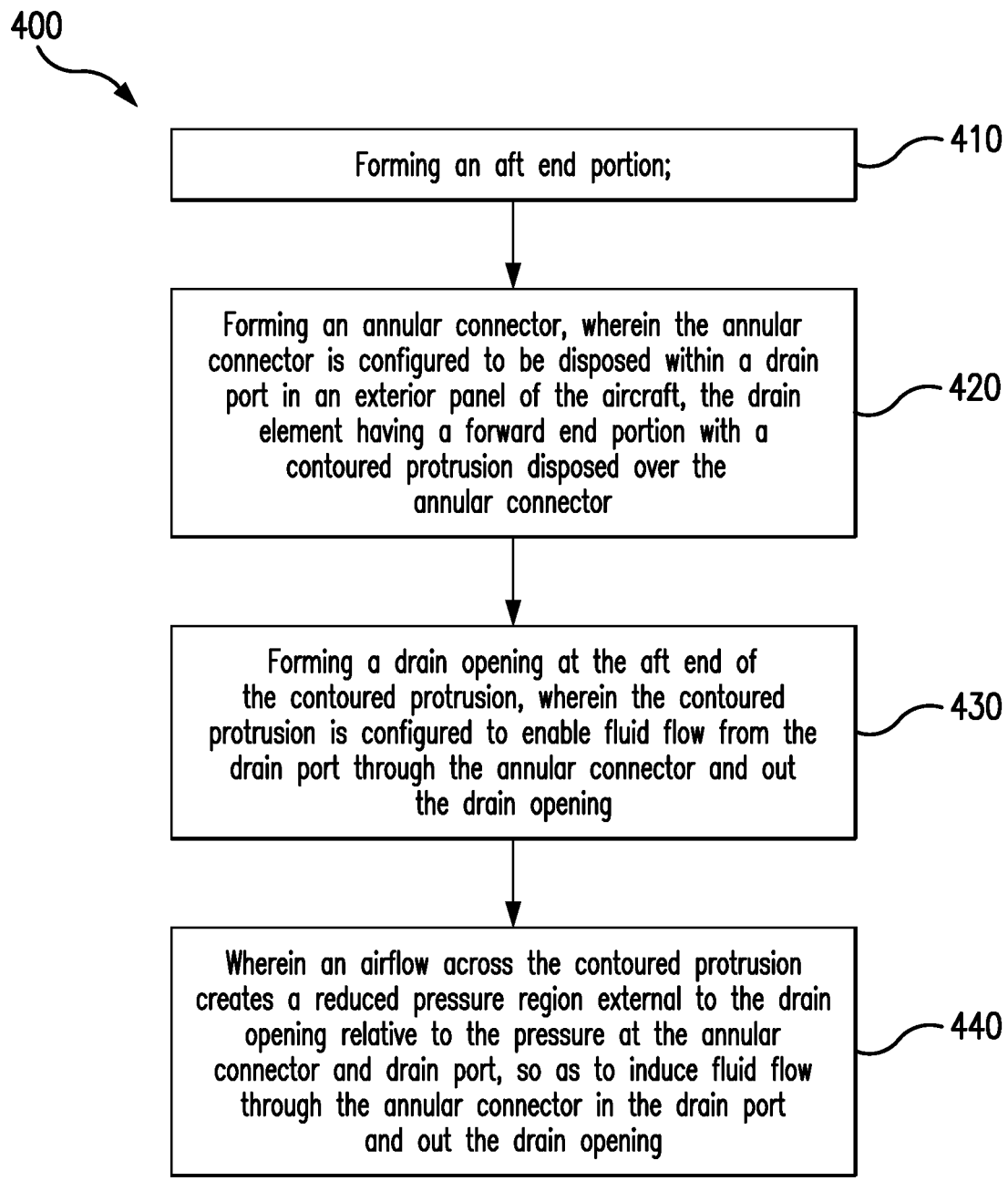
FIG. 4 shows a method of fabricating a drainage apparatus for drainage of fluid through an exterior of an aircraft according to examples as shown in FIGS. 1A-D and 2A-B.

FIG. 4 shows a method 400 for fabricating a drain element. In at least some embodiments, the method 400 may be used to fabricate a drain element (e.g., drain element 100, 200) for draining fluid through an exterior of an aircraft (e.g., aircraft wing 202). The method 400, at 410, includes forming an aft end portion (e.g., 110, 210). The method 400, at 420, includes forming an annular connector (e.g., annular connector 130, 230), wherein the annular connector is configured to be disposed within a drain port (e.g., drain port 232) in an exterior of the aircraft, the drain element having a forward end portion (e.g., forward end portion 220) with a contoured protrusion (e.g., contoured protrusion 125, 225) disposed over the annular connector. The method 400, at 430, includes forming a drain opening (e.g., drain opening 135, 235) at the aft end (e.g., aft end 127, 227) of the contoured protrusion, wherein the contoured protrusion enables fluid flow from the drain port through the annular connector and out the drain opening. The method 400, at 440, provides wherein an airstream or airflow across the contoured protrusion creates a reduced pressure region (e.g., reduced pressure region 129, 229) external to the drain opening relative to the pressure at the annular connector and drain port, so as to induce fluid flow through the annular connector in the drain port and out the drain opening. In at least some embodiments, the aft end portion of the drain element is configured to include a tension connector (e.g., tension connector 115, 215) to be disposed within an opening (e.g., opening 214) in the exterior of the aircraft. In at least some embodiments, the aft end portion of the drain element is configured to include a globular protrusion (e.g., globular protrusion 112, 212) positioned aft of the drain opening to inhibit air turbulence at the end of the contoured protrusion, such that flow of an external airstream across the contoured protrusion and the globular protrusion is generally laminar. In at least some embodiments, the contoured protrusion is configured to include a generally parabolic shape, and the globular protrusion is configured to include a generally bullet or teardrop shape. In at least some embodiments, the drain opening is configured to be in communication with the drain port, to enable fluid flow from an interior region (e.g., internal cavity 240) within the aircraft through the drain port and out the drain opening into an external airstream. In at least some embodiments, the contoured protrusion is configured to create a pressure differential between an interior pressure near the drain opening and an external airstream pressure, to cause a suction effect across the drain opening that induces drainage of water through the annular connector and out the drain opening. In at least some embodiments, the drain opening is designed to be less than a predetermined size so as to minimize any impact on an electromagnetic shielding.

In one or more embodiments, the drain elements 100, 200 may be retrofitted to attach to an aircraft. The drain elements 100, 200 may also be used on other vehicles, e.g., fast moving/high speed trains, unmanned aerial vehicles (UAV), drones, and the like. In at least some embodiments, for example, the drain elements 100, 200 may be aligned with existing drains. In other embodiments, the drain elements 100, 200 may be fitted to aircrafts and vehicles by drilling or otherwise making holes or openings with the aircraft that conform with and accept the annular connector 130, 230 and tension connector 115, 215 (when appropriate). In at least some embodiments, the drain elements 100, 200 may be formed by three-dimensional (3D) printing (e.g., 3D printed Nylon).

Based at least on the disclosures herein, the drain elements 100, 200 provide a means for mitigating the accumulation of water and other fluids within an aircraft. Therefore, the effects of added weight, and increased risk of rust and corrosion may be minimized. Consequently, the life of the aircraft, and the life of very expensive and critical components may be extended. Similarly, maintenance and repair costs may also be reduced. Further, the operating time, operating range, and the capability of the aircraft to perform missions in adverse conditions may also be increased.

Additional Notes and Examples

Example 1 provides a drain element for drainage of fluid through an exterior of an aircraft, the drain element having: an aft end portion; an annular connector, wherein the annular connector is to be disposed within a drain port in an exterior panel of the aircraft, the drain element having a forward end portion with a contoured protrusion disposed over the annular connector; and a drain opening at the aft end of the contoured protrusion, wherein the contoured protrusion enables fluid flow from the drain port through the annular connector and out the drain opening; wherein an airflow across the contoured protrusion creates a reduced pressure region external to the drain opening relative to the pressure at the annular connector and drain port, so as to induce fluid flow through the annular connector in the drain port and out the drain opening.

Example 2 includes the drain element of Example 1, wherein the aft end portion of the drain element includes a tension connector to be disposed within an opening in the exterior of the aircraft.

Example 3 includes the drain element of Example 1, wherein the aft end portion of the drain element comprises a globular protrusion positioned aft of the drain opening to inhibit air turbulence at the end of the contoured protrusion, such that flow of an external airstream across the contoured protrusion and the globular protrusion is generally laminar.

Example 4 includes the drain element of Example 3, wherein the contoured protrusion comprises a generally parabolic shape, and the globular protrusion comprises a generally teardrop shape.

Example 5 includes the drain element of Example 1, wherein the drain opening is in communication with the drain port, to enable fluid flow from an interior region within the aircraft through the drain port and out the drain opening into an external airstream.

Example 6 includes the drain element of Example 1, wherein the contoured protrusion is configured to create a pressure differential between an interior pressure near the drain opening and an external airstream pressure, to cause a suction effect across the drain opening that induces drainage of water through the annular connector and out the drain opening.

Example 7 includes the drain element of Example 1, wherein the drain opening is less than a predetermined size so as to minimize any impact on an electromagnetic shielding.

Example 8 provides a method for draining fluid through an exterior of an aircraft, including: disposing a drain element in an exterior panel of the aircraft, wherein the drain element includes an aft end portion; an annular connector, wherein the annular connector is to be disposed within a drain port in the exterior of an aircraft, the drain element having a forward end portion with a contoured protrusion disposed over the annular connector; and a drain opening at the aft end of the contoured protrusion, wherein the contoured protrusion enables fluid flow from the drain port through the annular connector and out the drain opening; wherein an airflow across the contoured protrusion creates a reduced pressure region external to the drain opening relative to the pressure at the annular connector and drain port, so as to induce fluid flow through the annular connector in the drain port and out the drain opening.

Example 9 includes the method of Example 8, wherein the aft end portion of the drain element includes a tension connector to be disposed within an opening in the exterior of the aircraft.

Example 10 includes the method of Example 8, wherein the aft end portion of the drain element comprises a globular protrusion positioned aft of the drain opening to inhibit air turbulence at the end of the contoured protrusion, such that flow of an external airstream across the contoured protrusion and the globular protrusion is generally laminar.

Example 11 includes the method of Example 10, wherein the contoured protrusion comprises a generally parabolic shape, and the globular protrusion comprises a generally teardrop shape.

Example 12 includes the method of Example 8, wherein the drain opening is in communication with the drain port, to enable fluid flow from an interior region within the aircraft through the drain port and out the drain opening into an external airstream.

Example 13 includes the method of Example 8, wherein the contoured protrusion is configured to create a pressure differential between an interior pressure near the drain opening and an external airstream pressure, to cause a suction effect across the drain opening that induces drainage of water through the annular connector and out the drain opening.

Example 14 includes the method of Example 8, wherein the drain opening is less than a predetermined size so as to minimize any impact on an electromagnetic shielding.

Example 15 provides a method of fabricating a drain element for drainage of fluid through an exterior of an aircraft, comprising: forming an aft end portion; forming an annular connector, wherein the annular connector is configured to be disposed within a drain port in an exterior panel of the aircraft, the drain element having a forward end portion with a contoured protrusion disposed over the annular connector; and forming a drain opening at the aft end of the contoured protrusion, wherein the contoured protrusion is configured to enable fluid flow from the drain port through the annular connector and out the drain opening; wherein an airflow across the contoured protrusion creates a reduced pressure region external to the drain opening relative to the pressure at the annular connector and drain port, so as to induce fluid flow through the annular connector in the drain port and out the drain opening.

Example 16 includes the method of Example 15, wherein the aft end portion of the drain element is configured to include a tension connector to be disposed within an opening in the exterior of the aircraft.

Example 17 includes the method of Example 15, wherein the aft end portion of the drain element is configured to include a globular protrusion positioned aft of the drain opening to inhibit air turbulence at the end of the contoured protrusion, such that flow of an external airstream across the contoured protrusion and the globular protrusion is generally laminar.

Example 18 includes the method of Example 17, wherein the contoured protrusion is configured to include a generally parabolic shape, and the globular protrusion is configured to include a generally teardrop shape.

Example 19 includes the method of Example 15, wherein the drain opening is configured to be in communication with the drain port, to enable fluid flow from an interior region within the aircraft through the drain port and out the drain opening into an external airstream.

Example 10 includes the method of Example 15, wherein the contoured protrusion is configured to create a pressure differential between an interior pressure near the drain opening and an external airstream pressure, to cause a suction effect across the drain opening that induces drainage of water through the annular connector and out the drain opening.

The terms "communication," "coupled," "attached," or "connected" can be used herein to refer to any type of relationship, direct or indirect, between the components in question, and can apply to electrical, mechanical, fluid, optical, electromagnetic, electromechanical or other connections. Additionally, the terms "first", "second", "third", etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action can occur, either in a direct or indirect manner.

Those skilled in the art will appreciate from the foregoing description that the broad techniques of the examples of the present disclosure can be implemented in a variety of forms. Therefore, while the examples of this disclosure have been described in connection with particular examples thereof, the true scope of the examples of the disclosure should not be so limited since other modifications will become apparent to the skilled practitioner upon a study of the drawings, specification, and following claims.

We claim:

1. A drain element for drainage of fluid from an interior region within an aircraft wing and through an exterior of an aircraft, comprising:
   an aft end portion;
   an annular connector, wherein the annular connector is to be disposed within a drain port in an exterior panel of the aircraft wing, the drain element having a forward end portion with a contoured protrusion disposed over the annular connector; and
   a drain opening at the aft end of the contoured protrusion, wherein the contoured protrusion enables fluid flow from the drain port through the annular connector and out the drain opening;
   wherein an airflow across the contoured protrusion creates a reduced pressure region external to the drain opening relative to the pressure at the annular connector and drain port, so as to induce fluid flow from an interior region within the aircraft wing and through the annular connector in the drain port and out the drain opening, and
   wherein the aft end portion of the drain element comprises a globular protrusion positioned aft of the drain opening to inhibit air turbulence at the end of the contoured protrusion, such that flow of an external airstream across the contoured protrusion and the globular protrusion is generally laminar.

2. The drain element of claim 1, wherein the aft end portion of the drain element includes a tension connector to be disposed within an opening in the exterior of the aircraft wing.

3. The drain element of claim 1, wherein the contoured protrusion comprises a generally parabolic shape, and the globular protrusion comprises a generally teardrop shape.

4. The drain element of claim 1, wherein the drain opening is in communication with the drain port, to enable fluid flow from an interior region within the aircraft wing through the drain port and out the drain opening into an external airstream.

5. The drain element of claim 1, wherein the contoured protrusion is configured to create a pressure differential between an interior pressure near the drain opening and an external airstream pressure, to cause a suction effect across the drain opening that induces drainage of water through the annular connector and out the drain opening.

6. A method for draining fluid from an interior region within an aircraft wing and through an exterior of an aircraft, comprising:
   disposing a drain element in an exterior panel of the aircraft wing, wherein the drain element includes:
   an aft end portion;
   an annular connector, wherein the annular connector is to be disposed within a drain port in the exterior of an aircraft, the drain element having a forward end portion with a contoured protrusion disposed over the annular connector; and
   a drain opening at the aft end of the contoured protrusion, wherein the contoured protrusion enables fluid flow from the drain port through the annular connector and out the drain opening;
   wherein an airflow across the contoured protrusion creates a reduced pressure region external to the drain opening relative to the pressure at the annular connector and drain port, so as to induce fluid flow from an interior region within an aircraft wing and through the annular connector in the drain port and out the drain opening, and wherein the aft end portion of the drain element comprises a globular protrusion positioned aft of the drain opening to inhibit air turbulence at the end of the contoured protrusion, such that flow of an external airstream across the contoured protrusion and the globular protrusion is generally laminar.

7. The method of claim 6, wherein the aft end portion of the drain element includes a tension connector to be disposed within an opening in the exterior of the aircraft wing.

8. The method of claim 6, wherein the contoured protrusion comprises a generally parabolic shape, and the globular protrusion comprises a generally teardrop shape.

9. The method of claim 6, wherein the drain opening is in communication with the drain port, to enable fluid flow from an interior region within the aircraft wing through the drain port and out the drain opening into an external airstream.

10. The method of claim 6, wherein the contoured protrusion is configured to create a pressure differential between an interior pressure near the drain opening and an external airstream pressure, to cause a suction effect across the drain opening that induces drainage of water through the annular connector and out the drain opening.

11. A method of fabricating a drain element for drainage of fluid from an interior region within an aircraft wing and through an exterior of an aircraft, comprising:
    forming an aft end portion;
    forming an annular connector, wherein the annular connector is configured to be disposed within a drain port in an exterior panel of the aircraft wing, the drain element having a forward end portion with a contoured protrusion disposed over the annular connector; and
    forming a drain opening at the aft end of the contoured protrusion, wherein the contoured protrusion is configured to enable fluid flow from the drain port through the annular connector and out the drain opening;
    wherein an airflow across the contoured protrusion creates a reduced pressure region external to the drain opening relative to the pressure at the annular connector and drain port, so as to induce fluid flow from an interior region within an aircraft wing and through the annular connector in the drain port and out the drain opening, and
    wherein the aft end portion of the drain element comprises a globular protrusion positioned aft of the drain opening to inhibit air turbulence at the end of the contoured protrusion, such that flow of an external airstream across the contoured protrusion and the globular protrusion is generally laminar.

12. The method of claim 11, wherein the aft end portion of the drain element is configured to include a tension connector to be disposed within an opening in the exterior of the aircraft wing.

13. The method of claim 11, wherein the contoured protrusion is configured to include a generally parabolic shape, and the globular protrusion is configured to include a generally teardrop shape.

14. The method of claim 11, wherein the drain opening is configured to be in communication with the drain port, to enable fluid flow from an interior region within the aircraft wing through the drain port and out the drain opening into an external airstream.

15. The method of claim 11, wherein the contoured protrusion is configured to create a pressure differential between an interior pressure near the drain opening and an external airstream pressure, to cause a suction effect across the drain opening that induces drainage of water through the annular connector and out the drain opening.

16. The drain element of claim 1, wherein a mating profile of the drain element matches a contour of the aircraft wing.

17. The drain element of claim 2, wherein the tension connector and the annular connector are placed within openings in the aircraft such that the drain element is retained under tension.

18. The method of claim 6, wherein a mating profile of the drain element matches a contour of the aircraft wing.

19. The method of claim 7, wherein the tension connector and the annular connector are placed within openings in the aircraft such that the drain element is retained under tension.

20. The method of claim 11, wherein a mating profile of the drain element matches a contour of the aircraft wing.

* * * * *